United States Patent [19]

Niederprüm et al.

[11] 4,112,046
[45] Sep. 5, 1978

[54] DISINTEGRATION OF SILICA-RICH CHROMITE

[75] Inventors: Hans Niederprüm, Monheim; Johann-Nikolaus Meussdoerffer, Blecher; Hans-George Nieder-Vahrenholz, Cologne; Wolfgang Bockelmann, Leverkusen, all of Fed. Rep. of Germany

[73] Assignee: Bayer Aktiengesellschaft, Leverkusen, Fed. Rep. of Germany

[21] Appl. No.: 747,261

[22] Filed: Dec. 3, 1976

[30] Foreign Application Priority Data

Dec. 19, 1975 [DE] Fed. Rep. of Germany ....... 2557403

[51] Int. Cl.$^2$ .................... C01G 37/14; C01B 33/26
[52] U.S. Cl. ..................................... 423/53; 423/61; 423/118
[58] Field of Search ............... 423/53, 61, 118, 328, 423/596

[56] References Cited

U.S. PATENT DOCUMENTS

| Re. 13,688 | 2/1914 | Gans et al. | 423/118 |
| 1,760,788 | 5/1930 | Specketer et al. | 423/61 |
| 3,510,256 | 5/1970 | Schafer | 423/61 |
| 3,812,234 | 5/1974 | Schafer | 423/61 |
| 3,859,412 | 1/1975 | Okabe et al. | 423/53 |

FOREIGN PATENT DOCUMENTS 612,517  11/1948  United Kingdom ............ 423/61

Primary Examiner—Brian Hearn
Attorney, Agent, or Firm—Burgess, Dinklage & Sprung

[57] ABSTRACT

In the disintegration of at least one chromium source selected from the group consisting of a $SiO_2$-containing chromite and a chromium-containing residue with an alkali compound at a temperature above about 800° C in the presence of atmospheric oxygen and a lime-free diluent, followed by leaching of the mixture with at least one of water and/or a chromium (VI)-containing aqueous solution, the improvement which comprises including in the mixture to be disintegrated an aluminum compound and at least sufficient alkali to form alkali chromate and to convert the $SiO_2$ into an alkali-aluminum silicate corresponding to the formula $nMe_2O \cdot mSiO_2 \cdot Al_2O_3$, wherein Me is at least one of sodium and potassium, $0.8 \leq n \leq 1.2$ and $1.3 \leq m \leq 4.3$.

7 Claims, No Drawings

DISINTEGRATION OF SILICA-RICH CHROMITE

This invention relates to a new process for the disintegration of chromites by means of alkali compounds in the presence of atmospheric oxygen and diluents which enables the chromium content of $SiO_2$-rich ores in particular to be converted into water-soluble alkali chromate (VI) to a far greater extent than is the case with conventional disintegration processes.

In the conventional process for disintegrating chromite, the finely powdered ore is heated with soda and/or sodium hydroxide at temperatures of from 900° to 1100° C. in the presence of air and diluents in disc-type or annular-hearth furnaces or in revolving tubular furnaces to disintegrate it into water-soluble sodium chromate.

A chemical chromite which is used (chemical grade = high-iron chromite in the nomenclature of the US Bureau of Mines, cf. Ullmanns Encyklopadie, IVth Edition, 1975, Vol. 9, page 606) has the following composition for example (Transvaal, South Africa): 44.5% of $Cr_2O_3$, 26.4% of FeO, 14.4% of $Al_2O_3$, 10.6% of MgO, 3.5% of $SiO_2$.

The silica content from minerals of the gangue is a considerable source of disturbance to alkaline disintegration because the silica consumes alkali and difficulties together with losses of yield occur during leaching of the melt (cf. P. Dilthey and I. Weise in Winnacker-Kuchler, Chemische Technologie, C. Hanser-Verlag Munich, Vol. 2, 1970, page 88).

The silica content of chromites is one of the reasons why the yield of chromate in the conventional disintegration process only amounts to from 75 to 85%, i.e. up to one quarter of the chromium present in the ore is not disintegrated, but instead remains in the leaching residue and, as so-called "leftover sludge", may still contain up to from 7 to 12% of $Cr_2O_3$. Moreover the leftover sludge, which may be dumped after suitable treatment, is becoming increasingly in need of attention in view of the growing shortage of raw materials.

Influencing the degree of disintegration by $SiO_2$ is dependent not only upon the already mentioned binding of alkali (which is then no longer available for the formation of alkali chromate), but also upon the preferential formation of alkali silicates from the gangue during the dissociation reaction. However, on account of the low melting point of the sodium silicate formed, for example 1,088° C., the disintegration reaction is then no longer so complete, because the oxygen may no longer diffuse adequately into the dissociation mixture. If the quantity of alkali added is increased, other elements present in the ore, especially the $Al_2O_3$, are also dissociated. Unfortunately, considerable difficulties are involved in working-up, especially filtering, aluminate-containing chromate solutions, German DOS No. 2,365,271, page 4.

Accordingly, chemical chromites should only contain from 3% to at most 5% of $SiO_2$ (cf. US Stockpile specification, W. Gocht, Handbuch der Metallmarkte, Springer-Verlag 1974, page 89).

In view, therefore, of the growing shortage of raw materials, especially chemical chromites for the manufacture of dichromate, it is desirable to increase the yield of chromate and to be able to use silicarich, for example chemical raw ores or metallurgical-grade or refractory-grade ores. Metallurgical-grade ores may contain up to 8% of $SiO_2$, while refractory-grade ores may contain up to 6% of $SiO_2$.

Accordingly, the present invention relates to a process for the disintegration of $SiO_2$-containing chromites and/or chromium-containing residues with alkali compounds at temperatures above about 800° C. in the presence of atmospheric oxygen and lime-free diluents, followed by leaching of the mixture with water and/or aqueous solutions containing chromium (VI), distinguished by the fact that to the mixture to be disintegrated is added such a quantity of an aluminum compound reacting with alkali and at least such a quantity of alkali in excess of the quantity required for alkali chromate formation that the $SiO_2$ is converted into an alkali-aluminum silicate corresponding to the general formula: $nMe_2O \cdot mSiO_2 \cdot Al_2O_3$, wherein Me represents sodium and/or potassium and $n$ and $m$ are integers or fractions of about $0.8 \leq n \leq 1.2$ and about $1.3 \leq m \leq 4.3$, respectively.

It has been found that even silica-rich chromites may be used in the conventional disintegration process without the addition of lime or dolomite and that, in the case of chemical-grade chromites, the yield may be improved by adding to the conventional disintegration mixture an aluminum compound which reacts readily with alkalis or mixtures thereof and, in addition, a quantity of soda and/or sodium hydroxide sufficient for the formation of sodium aluminate, even an excess of alkali being of no consequence.

Surprisingly the product formed may be effectively leached without any filtration problems arising.

The following aluminum compounds, for example, may be used either individually or in admixture as the aluminum compounds: aluminum hydroxides, hydrated aluminum oxides, aluminum oxides still capable of hydration, so-called "active aluminum oxides", low-$SiO_2$ bauxite, other aluminum-containing raw materials which react with alkali, also sodium aluminate itself. The quantity in which the aluminum compounds are added is governed by the $SiO_2$ content of the ores. The $SiO_2$ : $Al_2O_3$ ratio adjusted is generally of the order of from 0.5:1 to 4:1, but preferably of the order of from 1.5:1 to 2.5:1. It is surprising that it is possible, by additionally using aluminum compounds reacting with alkali, to eliminate the troublesome influence of $SiO_2$ in chromites although the ores used and the leaching residues employed as diluents themselves contain considerable quantities of $Al_2O_3$, for example from 10 to 30%.

A process developed in the 1920's, in which bauxite was used as additive for the dissociation of chromite, sought to produce both sodium chromate and also alumina at the same time by the common disintegration of chromite and bauxite with sufficient quantities of soda, cf. Ullmann, Vol. 5, loc.cit., page 571. Unfortunately, this process was never adopted for commercial working on account of technical deficiencies.

By contrast, the amount of aluminum compounds added in the process according to the present invention is much smaller, only as much being added as is required for converting the $SiO_2$ into insoluble aluminum silicate and for optimally disintegrating the chromite present without significant quantities of alumina entering the chromate liquor.

In one embodiment of the present process, the quantity of alkali required for disintegrating the ore is reacted under oxidizing conditions in a first stage with the leaching residue as diluent. In addition to alkali chromate and alkali ferrate (III), sodium aluminate, for example, is also formed in this first stage. In a second stage, the reaction mixture is reacted with fine ore under the conventional conditions. In this way, no more additional aluminum compound has to be added to the chromite disintegration mixture, instead of an active aluminum compound which binds $SiO_2$ is produced from the $Al_2O_3$ present in the leaching residue by the treatment with alkali. Only the quantity of alkali is increased in relation to the normal mixture composition, corresponding to the $SiO_2$ content of the ore.

This embodiment of the chromite disintegration process gives a better yield of chromium than conventional processes, even when the latter are carried out with a corresponding excess of soda (cf. Example 1b), in addition to which the disadvantages referred to above occur.

The leaching residue, which is used as diluent is employed in a weight ratio to the ore of from about 1:1 to 3:1.

The process according to the present invention is illustrated by the following Examples.

EXAMPLE 1a (Comparison Example with Example 2)

A metallurgical-grade chromite containing 48.2% of $Cr_2O_3$, 8.1% of $Al_2O_3$ and 7% of $SiO_2$ was "conventionally" disintegrated with soda under oxidizing conditions as follows:

67 parts of soda (100% of the theoretical amount, based on all the $Cr_2O_3$ present in the ore) were added to 100 parts of chromite, 180 parts of dried leaching residue from a preceding disintegration batch and 15 parts of cinders. The mixture was finely ground and calcined for 2 hours at 1100° C. in the presence of air in a muffle furnace. The reaction mixture was then leached with 400 parts of water, the alkali chromate passing into solution. Based on all the chromium present in the ore, the yield amounted to 67% in the form of sodium chromate. The transfer of this laboratory test to an industrial unit, for example a revolving tubular furnace, is only possible with considerable difficulty and heavy losses of yield because viscous/doughy phases are formed.

EXAMPLE 1b (Comparison Example with Example 4)

30 parts of metallurgical-grade fine ore containing 48.2% of $Cr_2O_3$, 7.0% of $SiO_2$ and 8.1% of $Al_2O_3$ were disintegrated under oxidizing conditions for 2 hours at 1080° C. with 43.8 parts of soda in a large excess (217% of the theoretical amount) and with 54 parts of $Fe_2O_3$ and 4.5 parts of cinders. After the mixture had been leached, chromate was obtained in a yield of only 69.9% in spite of the large excess of soda used. Further disadvantages arose through the excessive formation of liquid/doughy phases in the furnace and through the very high alkali content of the chromate liquor (14.5% in the form of free NaOH).

EXAMPLE 2

The chromite of Example 1, containing 48.2% of $Cr_2O_3$, 8.1% of $Al_2O_3$ and 7% of $SiO_2$, was again disintegrated with soda under oxidizing conditions. On this occasion, however, active $Al_2O_3$ and the quantity of soda required for the formation of sodium aluminate were additionally added. The amount of $Al_2O_3$ added was governed by the $SiO_2$ content of the ore, an $Al_2O_3$:$SiO_2$ ratio of about 1:2 being aimed at. The reaction mixture consisted of: 100 parts of chromite, 180 parts of dried leaching residue from the preceding disintegration batch, 15 parts of cinders, 6 parts of active $Al_2O_3$ and 74 parts of soda (110% of the theoretical amount). After heating for 2 hours at 1100° C., the reaction mixture was leached with 400 parts of water and subsequently filtered. Based on the total amount of chromium present in the ore, the yield amounted to 76.5% in the form of sodium chromate.

The transfer of this laboratory test to an industrial unit, for example a revolving tubular furnace, is readily possible because the formation of viscous/doughy phases did not occur or was quickly overcome.

EXAMPLE 3

The chromite of Examples 1 and 2 was again disintegrated with soda under oxidizing conditions. On this occasion, however, the active $Al_2O_3$ was replaced by sodium aluminate so that the quantity of soda was again reduced to the level theoretically required for the $Cr_2O_3$ content of the chromite: 100 parts of chromite, 180 parts of leaching residue from the previous disintegration, batch, 15 parts of cinders, 9.7 parts of $NaAlO_2$ and 67 parts of soda (100% of the theoretical amount) were calcined for 2 hours at 1100° C. in the presence of air in a muffle furnace.

Thereafter, the reaction mixture was again leached in 400 parts of water and filtered. The yield of chromium amounted to 75.8%, based on the total quantity of chromium present in the ore.

EXAMPLE 4

The leaching residue obtained in Example 1, containing 13.1% of $Cr_2O_3$, 14.9% of $Al_2O_3$ and 14.9% of $SiO_2$, was disintegrated under oxidizing conditions in the first stage with such an excess of soda (217% of the theoretical amount, based on $Cr_2O_3$ still present) that, on the one hand, theoretically enough soda, in the form of alkali, for theoretically converting all the chromium in the mixture into chromate was subsequently present for the fresh chromite added in the second stage of the reaction, whilst, on the other hand, enough alkali was present for converting the $Al_2O_3$ present in the leaching residue into $NaAlO_2$.

70 parts of leaching residue were calcined under oxidizing conditions for 2 hours at 1100° C. with 43.8 parts of soda, subsequently mixed with 30 parts of chromite (for composition, see Example 1) and redisintegrated for 2 hours at 1100° C. in the presence of air. After leaching with 400 parts of water, a chromate yield of 79.7% was obtained, based on the $Cr_2O_3$ present in the fine ore.

EXAMPLE 5

(Comparison Example with Example 6)

A chemical-grade chromite with the following composition: 45.6% of $Cr_2O_3$, 14.9% of $Al_2O_3$ and 5.0% of $SiO_2$, was disintegrated under oxidizing conditions in the same way as in Comparison Example 1a, the temperature amounting to 1000° C., the reaction time to 2 hours and the composition of the mixture being as follows: 100 parts of chromite, 180 parts of leaching residue from a previous disintegration batch, 15 parts of cinders and 63.6 parts of soda (100% of the theoretical amount). After the reacted reaction mixture had been leached with 400 parts of water, sodium chromate was obtained in a yield of 82.1%, based on all the chromium present in the chromite.

EXAMPLE 6

A chromite with the same composition as in Example 5 was on this occasion disintegrated under oxidizing conditions with the quantity of $NaAlO_2$ stoichiometrically necessary for all the $SiO_2$ present, the other conditions being the same as in Example 5:

100 parts of chromite, 180 parts of leaching residue from a preceding test, 15 parts of cinders, 6.9 parts of $NaAlO_2$ and 63.6 parts of soda (100% of the theoretical amount) were reacted in the same way as described in Example 5 and subsequently washed with 400 parts of water. The yield of chromium amounted to 93%, based on the chromium present in the ore.

EXAMPLE 7a

A chemical raw ore, which has not already been processed and which has the following composition:

9.1% $SiO_2$; 21.86% $Fe_2O_3$; 39.12% $Cr_2O_3$; 16.5% $Al_2O_3$ and 12.6% MgO was disintegrated with soda and with the addition of $Al_2O_3$ under oxidation conditions at 1.050° C. in a muffle-furnace, the disintegration mixture contained the following parts by weight:
100 parts of fine ore
15 parts of cinders
180 parts dried lyeing residue from a previous disintegration batch
7.7 parts of active $Al_2O_3$
79 parts of soda.

The amount of soda employed was calculated so as to contain on the one hand a theoretical excess amount of 30% of soda for the disintegration of the $Cr_2O_3$ contained in a fine ore and on the other hand additional soda in an amount necessary for the formation of $Na_2O \cdot Al_2O_3 \cdot 2 SiO_2$; in calculating the amount of active $Al_2O_3$ to be added the assumption was made, that $Al_2O_3$ contained in the fine ore is not responsible for the formation of $Na_2O \cdot Al_2O_3 \cdot 2SiO_2$ from the $SiO_2$ which appears as a gangue. After a disintegration period of 2 hours a yield of 95.6% chromate was isolated from the klinker, this figure being based on the $Cr_2O_3$ contained in the fine ore.

EXAMPLE 7b — COMPARISON EXAMPLE

The chromite in example 7a was disintegrated with oxidation under comparable conditions, however without the addition of $Al_2O_3$ and the amount of alkali required for the formation of $Na_2O \cdot Al_2O_3 \cdot 2 SiO_2$ as follows:

100 parts of fine ore, 15 parts of cinders, 180 parts of dried lyeing residue from a previous disintegration batch and 71 parts of soda.

After 2 hours at 1,050° C. it was possible to recover chromite from the partly vitreous klinker in a yield of 66.1% only, this figure being based on the $Cr_2O_3$ contained in the fine ore applied. The explanation for the extremely pure yield is that with this high silicate content in the presence of alkali relatively low melting point alkali silicates are formed, which prevent or render difficult a diffusion of the oxygen into the underlaying layers.

It will be appreciated that the instant specification and examples are set forth by way of illustration and not limitation, and that various modifications and changes may be made without departing from the spirit and scope of the present invention.

What is claimed is:

1. In the disintegration of at least one chromium source selected from the group consisting of a $SiO_2$—containing chromite and a chromium-containing residue with an alkali compound at a temperature above about 800° C. in the presence of atmospheric oxygen and a lime-free diluent, followed by leaching of the mixture with at least one of water and a chromium (VI)-containing aqueous solution to form a chromate liquor, the improvement which comprises including in the mixture to be disintegrated an aluminum compound and at least sufficient alkali to form alkali chromate and to convert the $SiO_2$ into an insoluble alkali-aluminum silicate corresponding to the formula $nMe_2O \cdot mSiO_2 \cdot Al_2O_3$, wherein Me is at least one of sodium and potassium, $0.8 \leq n \leq 1.2$ and $1.3 \leq m \leq 4.3$, whereby disintegration is effected with minimal formation of liquid or doughy phases and the chromium is thereafter leached from the mixture in high yield without significant quantities of alumina entering the chromate liquor.

2. The process as claimed in claim 1, wherein the alkali compound is at least one of sodium hydroxide and soda.

3. The process as claimed in claim 1 wherein the chromium source is a chemical-grade ore, a silica-rich metallurgical-grade ore or a refractory-grade ore.

4. The process as claimed in claim 1, wherein the aluminum compound is selected from the group consisting of aluminum hydroxide, hydrated aluminum oxide, aluminum oxide still capable of hydration, active aluminum oxide, sodium aluminate and bauxite.

5. The process as claimed in claim 1, wherein the quantity of alkali is substantially equivalent to the $Cr_2O_3$ content of the ore and to the quantity of $Al_2O_3$ added or included.

6. The process as claimed in claim 1, wherein leaching residue from a previous cycle is employed as the diluent and is reacted in a first stage under oxidizing conditions with the total quantity of alkali required to form alkali chromate and convert the $SiO_2$ into alkali-aluminum silicate, and the alkali aluminate-containing reaction product is reacted in a second stage with the silica-containing chromite to be disintegrated.

7. The process as claimed in claim 6, wherein the chromium source is a chemical-grade ore, a silica-rich metallurgical-grade ore or a refractory-grade ore, the alkali compound is at least one of sodium hydroxide and soda, the aluminum compound is selected from the group consisting of aluminum hydroxide, hydrated aluminum oxide, aluminum oxide still capable of hydration, active aluminum oxide, sodium aluminate and bauxite, the aluminum compound is added in such amount that the $Al_2O_3:SiO_2$ ratio is from about 1:1.5 to 1:2.5, the quantity of alkali is substantially equivalent to the $Cr_2O_3$ content of the ore and to the quantity of $Al_2O_3$ added, and the leaching residue diluent is employed in a weight ratio to the ore of about 1:1 to 3:1.

* * * * *